(12) United States Patent
Homma et al.

(10) Patent No.: US 12,202,484 B2
(45) Date of Patent: Jan. 21, 2025

(54) AUTOMATIC REVERSE DRIVING CONTROLLER

(71) Applicant: SUBARU CORPORATION, Tokyo (JP)

(72) Inventors: Takuya Homma, Tokyo (JP); Tsukasa Mikuni, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 245 days.

(21) Appl. No.: 17/948,840

(22) Filed: Sep. 20, 2022

(65) Prior Publication Data
US 2023/0117429 A1    Apr. 20, 2023

(30) Foreign Application Priority Data
Oct. 14, 2021    (JP) .................. 2021-169111

(51) Int. Cl.
| | |
|---|---|
| *B60W 30/18* | (2012.01) |
| *B60W 10/20* | (2006.01) |
| *B60W 30/02* | (2012.01) |
| *B60W 30/09* | (2012.01) |
| *B60W 30/095* | (2012.01) |
| *B60W 50/00* | (2006.01) |

(52) U.S. Cl.
CPC ...... *B60W 30/18036* (2013.01); *B60W 10/20* (2013.01); *B60W 30/02* (2013.01); *B60W 30/09* (2013.01); *B60W 30/0953* (2013.01); *B60W 2050/0082* (2013.01); *B60W 2520/06* (2013.01); *B60W 2720/24* (2013.01)

(58) Field of Classification Search
CPC ......... B60W 10/20; B60W 30/02–045; B60W 30/06; B60W 30/08; B60W 30/09–0956; B60W 30/18036; B60W 2520/06; B60W 2720/24; G05D 1/0061; G05D 1/0088; G05D 1/021; G05D 1/0214; G05D 1/0221; G05D 1/0223
See application file for complete search history.

(56) References Cited

FOREIGN PATENT DOCUMENTS

| JP | 2020-131972 A | 8/2020 |
|---|---|---|
| KR | 20210114606 A * | 9/2021 |

* cited by examiner

*Primary Examiner* — Hung Q Nguyen
*Assistant Examiner* — Mark L. Greene
(74) *Attorney, Agent, or Firm* — Rimon P.C.

(57) ABSTRACT

An automatic reverse driving controller includes a control unit. The control unit includes a traveling information input unit, a traveling information storage unit, an automatic reverse traveling instruction input unit, and a processing unit. The traveling information input unit inputs information on a traveling trajectory of the vehicle and a road surface condition. The traveling information storage unit stores the inputted information on the traveling trajectory and the road surface condition. The automatic reverse traveling instruction input unit receives an input of an instruction to switch from traveling by a driving operation of a driver of the vehicle to automatic reverse traveling by the control unit. The processing unit corrects, in response to the input of the instruction, a traveling trajectory of an outward route on the basis of the road surface condition to determine a traveling route for a return route, and control reverse traveling of the vehicle.

8 Claims, 6 Drawing Sheets

AUTOMATIC REVERSE DRIVING CONTROLLER

CROSS-REFERENCE TO RELATED APPLICATIONS

The present application claims priority from Japanese Patent Application No. 2021-169111 filed on Oct. 14, 2021, the entire contents of which are hereby incorporated by reference.

BACKGROUND

The disclosure relates to an automatic reverse driving controller that controls driving of a vehicle upon automatic reversing.

A vehicle such as an automobile traveling, for example, on a bad road, a narrow mountain road, or a narrow street may not be able to travel forward and may be forced to travel in reverse in some cases. For example, there is a case where no travelable road surface exists ahead of a vehicle while traveling on a bad road. In addition, there is a case where a vehicle faces an oncoming vehicle at a location of a narrow road width where vehicles are not able to pass each other. Further, a vehicle may possibly be forced to travel in reverse in a circumstance where traveling is difficult, such as a case where the vehicle reaches a dead end, with no road ahead of the vehicle.

For this reason, a driving assistance apparatus has been proposed that enables easy driving of a vehicle by assisting a vehicle operation during reversing on the basis of a traveling history of a vehicle upon forward traveling, even under a circumstance where the reverse traveling is difficult. In addition, a driving assistance apparatus has also been proposed that reverses a vehicle stably and easily while avoiding a contact with an obstacle. For example, reference is made to Japanese Unexamined Patent Application Publication No. 2020-131972.

SUMMARY

An aspect of the disclosure provides an automatic reverse driving controller. The automatic reverse driving controller includes a control unit configured to control driving and steering of a vehicle and configured to control traveling of the vehicle. The control unit includes a traveling information input unit, a traveling information storage unit, an automatic reverse traveling instruction input unit, and a processing unit. The traveling information input unit is configured to input information related to a traveling trajectory of the vehicle and a road surface condition. The traveling information storage unit is configured to store the inputted information related to the traveling trajectory of the vehicle and the road surface condition. The automatic reverse traveling instruction input unit is configured to receive an input of a switching instruction to switch from traveling performed by a driving operation of a driver who drives the vehicle to automatic reverse traveling performed by the control unit. The processing unit is configured to, in response to the input of the switching instruction, correct a traveling trajectory of an outward route on the basis of the road surface condition to determine a traveling route for a return route, and control reverse traveling of the vehicle.

An aspect of the technology provides an automatic reverse driving controller. The automatic reverse driving controller includes circuitry. The circuitry is configured to: control driving and steering of a vehicle and control traveling of the vehicle; input information related to a traveling trajectory of the vehicle and a road surface condition; store the inputted information related to the traveling trajectory of the vehicle and the road surface condition: receive an input of a switching instruction to switch from traveling performed by a driving operation of a driver who drives the vehicle to automatic reverse traveling performed by the control unit; and correct, in response to the input of the switching instruction, a traveling trajectory of an outward route on the basis of the road surface condition to determine a traveling route for a return route, and control reverse traveling of the vehicle.

BRIEF DESCRIPTION OF THE DRAWINGS

The accompanying drawings are included to provide a further understanding of the technology, and are incorporated in and constitute a part of this specification. The drawings illustrate example embodiments and, together with the specification, serve to explain the principles of the technology.

DETAILED DESCRIPTION

In a case where a road surface condition is poor and thus slipping occurs during forward traveling, for example, it may be inappropriate in some cases to oppositely travel a traveling trajectory of an outward route as it is. In addition, there is a temporal interval between the time of forward traveling and the time of reverse traveling, and thus the road surface condition may be changed in some cases between the time of the forward traveling and the time of the reverse traveling. For this reason, there is a possibility that it may be difficult to cope with, for example, the change in the road surface condition or the slipping during the forward traveling, thus making it difficult to perform appropriate reverse traveling.

It is desirable to provide an automatic reverse driving controller that makes it possible to cope with a change in a road surface condition or improvement in unstable traveling during forward traveling, allow a vehicle to easily return even when being unable to travel forward, and allow a driver of the vehicle to travel, for example, on a bad road at ease.

In the following, some example embodiments of the disclosure are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

[Vehicle 1]

Figure 1:
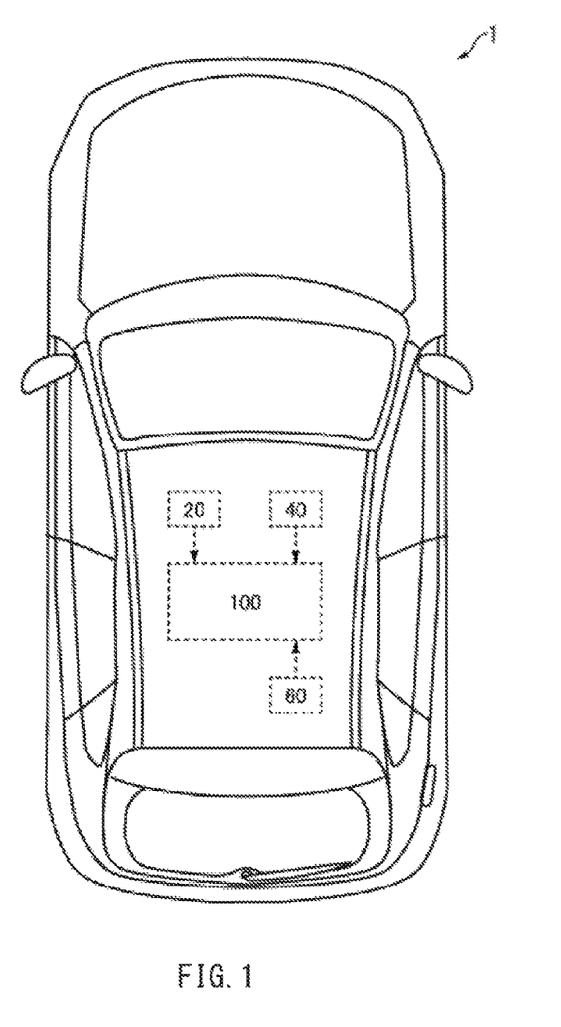
FIG. 1 is a schematic diagram illustrating a vehicle mounted with an automatic reverse driving controller according to one example embodiment of the disclosure.

FIG. 1 illustrates a schematic diagram of a vehicle 1 mounted with an automatic reverse driving controller according to an example embodiment of the disclosure.

As illustrated in FIG. 1, the vehicle 1 may include a traveling information detection unit 20, an automatic reverse traveling input operation unit 40, a vehicle behavior monitor 60, and an ECU 100.

Note that the automatic reverse driving controller according to an example embodiment of the disclosure may include a control unit and may be configured by the ECU 100. In one embodiment, the vehicle 1 may serve as a "vehicle". In one embodiment, the vehicle behavior monitor 60 may serve as a "vehicle behavior monitor". In one embodiment, the ECU 100 may serve as a "control unit".

The traveling information detection unit 20 may detect information related to a traveling trajectory of the vehicle 1 and a road surface condition, for example.

The automatic reverse traveling input operation unit 40 may be an operation unit that inputs an operation of an instruction to switch from traveling to be performed by a driving operation of a driver of the vehicle 1 to automatic reverse driving performed by the ECU 100.

The vehicle behavior monitor 60 may monitor a vehicle operation of the driver and a movement of the vehicle 1, and may automatically control braking and engine power in response to a state of traveling. That is, the vehicle behavior monitor 60 may stabilize vehicle behavior in response to the state of traveling. This enables the vehicle 1 to reduce skidding when turning at a slippery road surface or at a curve, or when avoiding an obstacle, thus making it possible for the vehicle 1 to travel stably.

In addition, in a case where the above-described functions are activated, for example, due to inconsistency between the vehicle operation and the movement of the vehicle 1, the vehicle behavior monitor 60 may notify the ECU 100 of a traveling range where the functions are activated as well as a traveling state and a traveling trajectory, and may cause the ECU 100 to store the traveling range, the traveling state, and the traveling trajectory.

[ECU 100]

Figure 2:
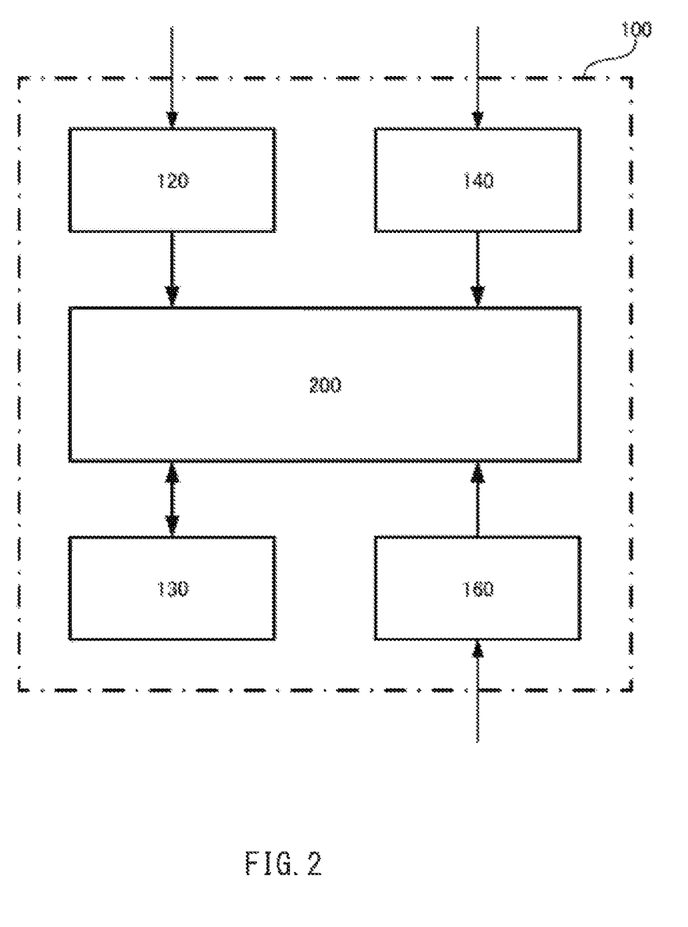
FIG. 2 is a block diagram illustrating a schematic configuration of an ECU according to one example embodiment of the disclosure.

As illustrated in FIG. 2, the ECU 100 may include a traveling information input unit 120, a traveling information storage unit 130, an automatic reverse traveling instruction input unit 140, a vehicle behavior monitoring information input unit 160, and a processor 200. In one embodiment, the traveling information input unit 120 may serve as a "traveling information input unit". In one embodiment, the traveling information storage unit 130 may serve as a "traveling information storage unit". In one embodiment, the automatic reverse traveling instruction input unit 140 may serve as an "automatic reverse traveling instruction input unit". In one embodiment, the vehicle behavior monitoring information input unit 160 may serve as a "vehicle behavior monitoring information input unit". In one embodiment, the processor 200 may serve as a "processing unit". The ECU 100 may include a ROM and a RAM, for example. As described later, the processor 200 may load a program of automatic reverse driving control processing stored in the ROM into the RAM, and may execute the program.

The traveling information input unit 120 may input the information related to the traveling trajectory of the vehicle 1 and the road surface condition, for example, detected by the traveling information detection unit 20.

The traveling information storage unit 130 stores the inputted information related to the traveling trajectory of the vehicle and the road surface condition, for example. In addition, the traveling information storage unit 130 may store road data on a traveling road on which the vehicle 1 travels. Note that this road data is not limited to data stored in advance, but may be data acquired later, for example, in accordance with the traveling of the vehicle 1. This road data may include not only route information, but also road widths of traveling roads and curvatures of corners, for example.

The automatic reverse traveling instruction input unit 140 may input an instruction to switch to automatic reverse traveling operated by the automatic reverse traveling input operation unit 40.

When the vehicle behavior monitor 60 is activated, such as a case where the vehicle behavior monitor 60 monitors the inconsistency between the vehicle operation and the movement of the vehicle 1, the vehicle behavior monitoring information input unit 160 may input, for example, traveling information and a traveling trajectory at the time of the activation. Note that the processor 200 may store, for example, the inputted traveling information and traveling trajectory in the traveling information storage unit 130.

[Processor 200]

The processor 200 may control driving and steering of the vehicle 1 to control the traveling of the vehicle 1.

When the switching instruction is inputted by the automatic reverse traveling instruction input unit 140, the processor 200 may correct a traveling trajectory on an outward route on the basis of the road surface condition to determine a traveling route for a return route, and may control reverse traveling of the vehicle 1 to control the reverse traveling to a predetermined point. The predetermined point may be a reverse traveling end point described later.

The processor 200 may determine the traveling route for the return route corrected in a traveling range where the vehicle behavior monitor 60 has been activated, and decelerates the vehicle 1 before reaching the traveling range where the vehicle behavior monitor 60 has been activated. For example, the traveling range may be a traveling range where the vehicle operation and the movement of the vehicle 1 are inconsistent with each other.

In a case where the vehicle operation and the movement of the vehicle 1 are inconsistent with each other at rear wheels in the traveling rang where the vehicle behavior monitor 60 has been activated, the processor 200 may set a traveling trajectory of front wheels on an outward route as the traveling route for the return route.

In a case where the vehicle operation and the movement of the vehicle 1 are inconsistent with each other at the front wheels in the traveling range where the vehicle behavior monitor 60 has been activated, the processor 200 may set a traveling range along a curvature of a road as the traveling route for the return route on the basis of road data in the traveling trajectory on the outward route.

In a case where an obstacle is detected in the traveling range where the vehicle behavior monitor 60 has been activated and an obstacle is detected also in reversing, the processor 200 may determine a traveling route for the return route that avoids the obstacle on the basis of the traveling trajectory of the outward route.

Next, description is given of the automatic reverse driving control processing. As for the automatic reverse driving control processing, the program of the automatic reverse driving control processing may be stored in the ROM of the ECU 100, and may be loaded into the RAM of the ECU 100 when an ignition is turned on, thus causing the processor 200 to start the automatic reverse driving control processing. Note that the automatic reverse driving control processing may be started, for example, by key unlock of the vehicle 1 or opening and closing operations of a door. For example, the opening and closing operations of a door may be opening and closing operations associated with release of locking of a door on a side of a driver's seat. In addition, the program of the automatic reverse driving control processing may be stored in a predetermined storage medium, and may be read and executed by a computer, for example.

Figure 3:
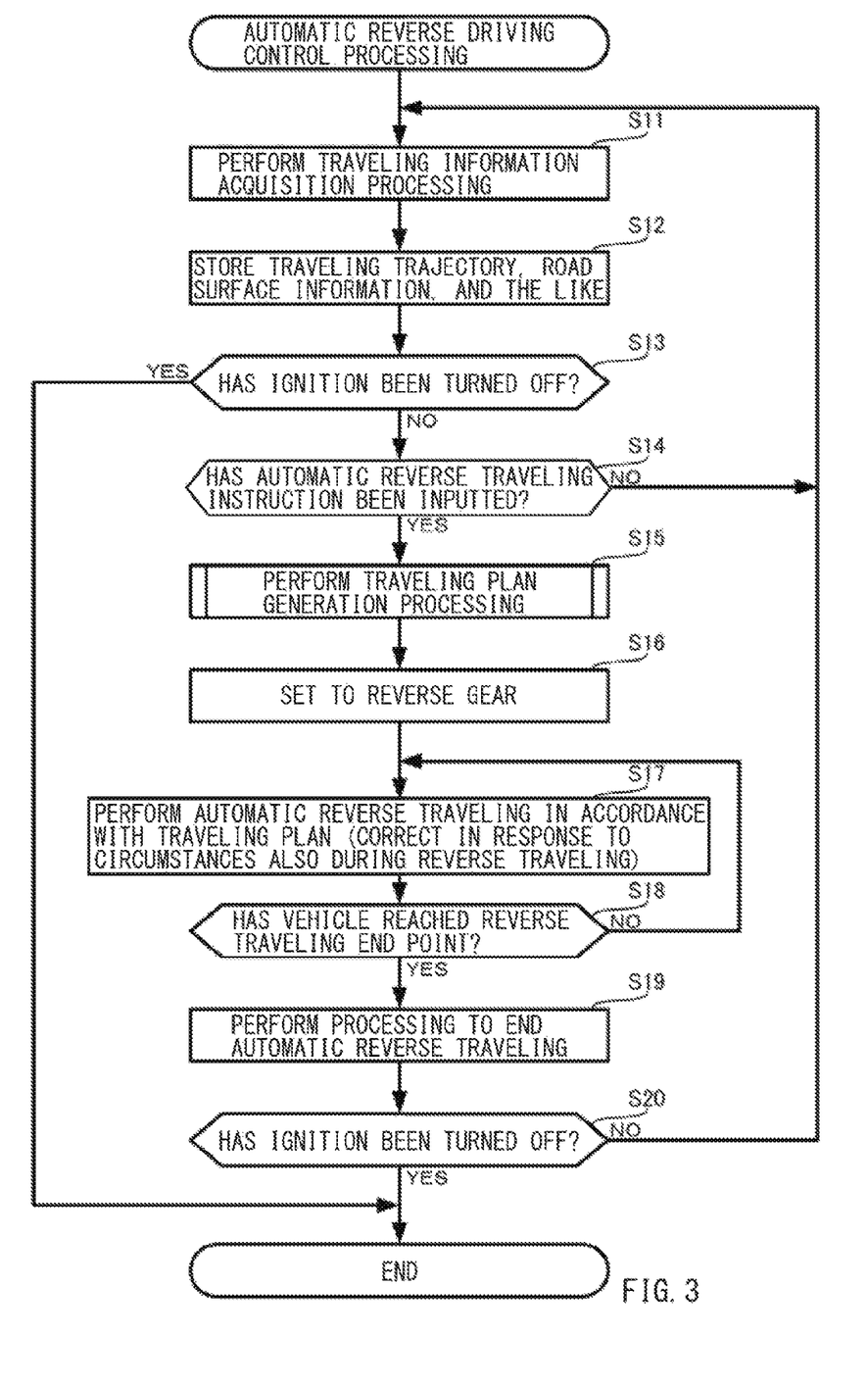
FIG. 3 is flowchart illustrating automatic reverse driving control processing.

Description is given below of the automatic reverse driving control processing with reference to FIG. 3.

[Step S11]

When the ignition is turned on, the processor 200 may start main processing of the automatic reverse driving control processing. When the automatic reverse driving control processing is started, the processor 200 may perform traveling information acquisition processing in Step S11. For example, the processor 200 may acquire the traveling trajectory of the vehicle 1 or road surface information detected by the traveling information detection unit 20. In a case where the vehicle behavior monitor 60 is activated, the processor 200 may acquire, for example, activation information on the vehicle behavior monitor 60. In one example, the processor 200 may acquire, via the traveling information input unit 120, information detected by the traveling information detection unit 20, such as the traveling trajectory of the vehicle 1, a steering angle at each predetermined distance, a vehicle speed at each steering angle, presence or absence of an obstacle on a traveling route as well as a position thereof, and a road surface μ. In addition, the processor 200 may acquire, via the vehicle behavior monitoring information input unit 160, information such as an activation position and activation degree of the vehicle behavior monitor 60, positions of wheels for which the vehicle behavior monitor 60 is activated, and a change in gravity upon activation of the vehicle behavior monitor 60.

[Step S12]

Thereafter, in Step S12, the processor 200 may store, in the traveling information storage unit 130, the acquired traveling trajectory of the vehicle 1 and road surface information, and, for example, the activation information on the vehicle behavior monitor 60 in a case where the vehicle behavior monitor 60 is activated.

[Step S13]

Thereafter, in Step S13, the processor 200 may perform processing to determine whether the ignition has been turned off. In a case where determination is made that the ignition has been turned off, the processor 200 may end the automatic reverse driving control processing. In a case where determination is made that the ignition has not been turned off, the processor 200 may cause the processing to proceed to Step S14.

[Step S14]

In Step S14, the processor 200 may perform processing to determine whether an automatic reverse traveling instruction has been inputted. That is, the processor 200 may determine whether the automatic reverse traveling input operation unit 40 has been operated. In one example, the processor 200 may determine whether the automatic reverse traveling instruction input unit 140 has inputted the instruction to switch to automatic reverse driving from the automatic reverse traveling input operation unit 40. In a case where determination is made that the automatic reverse driving instruction has been inputted, the processor 200 may cause the processing to proceed to Step S15. In a case where determination is made that the automatic reverse traveling instruction has not been inputted, the processor 200 may cause the processing to proceed to Step S11.

[Step S15]

In Step S15, the processor 200 may perform traveling plan generation processing. The processor 200 may generate a traveling plan of automatic reverse traveling of the vehicle 1 to perform reverse traveling to a predetermined point in the traveling plan generation processing. The traveling plan of the automatic reverse traveling of the vehicle 1 may be generated on the basis of, for example, the activation information on the vehicle behavior monitor together with the traveling trajectory of the outward route stored in the traveling information storage unit 130. Note that the predetermined point (hereinafter, referred to as a "reverse traveling end point") to which the vehicle 1 is reversed in the automatic reverse traveling may be a point set by an input of a driver of the vehicle 1 or may be a point set by the processor 200. Examples of the reverse traveling end point to be set by the processor 200 may include a branch point that enables branching, a point where a road surface condition is stable, and a point with no obstacle within a predetermined range. Description is given later in detail of the traveling plan generation processing.

[Step S16]

Thereafter, in Step S16, the processor 200 may perform processing to set to a reverse gear. In one example, the processor 200 may set a traveling range to an R range to change, for example, a hydraulic pressure to allow a transmission gear to be shifted to the reverse gear.

[Step S17]

Then, in Step S17, the processor 200 may perform the automatic reverse traveling of the vehicle 1 in accordance with the traveling plan. In one example, the processor 200 may control, for example, driving and steering of the vehicle 1 on the basis of the generated traveling plan of the automatic reverse traveling described above to execute the reverse traveling of the vehicle 1. Note that the processor 200 may correct the traveling plan of the automatic reverse traveling in response to circumstances also during the reverse traveling. For example, in a case where an obstacle not having existed before the start of the automatic reverse traveling, i.e., during the generation of the traveling plan appears during the reverse traveling, the processor 200 may correct the traveling plan to avoid this obstacle.

In a case where the road surface condition is changed between the time of traveling on the outward route and the time of traveling on the return route, the processor 200 may correct the traveling plan in response to the change in the road surface condition. For example, in a case where the road surface is more slippery than the time of traveling on the outward route, the processor 200 may take a measure such as decreasing the vehicle speed to lower than that of the traveling plan or making modification into a traveling plan in which the route is changed.

[Step S18]

Thereafter, in Step S18, the processor 200 may perform processing to determine whether the vehicle 1 has reached the reverse traveling end point. That is, the processor 200 may execute the automatic reverse traveling to determine whether the vehicle 1 has traveled to the reverse traveling end point. In a case where determination is made that the vehicle 1 has reached the reverse traveling end point, the processor 200 may cause the processing to proceed to Step S19. In a case where determination is made that the vehicle 1 has not yet reached the reverse traveling end point, the processor 200 may cause the processing to proceed to Step S17.

[Step S19]

In Step S19, the processor 200 may perform processing to end the automatic reverse traveling. In one example, the processor 200 may cause the vehicle 1 to stop, and may set the gear to a parking gear. In addition, the processor 200 may inform the driver of the vehicle 1 of the ending of the automatic reverse traveling, and may urge the driver to brake. Note that the processor 200 may apply an automatic brake until the driver performs some operation, or alternatively the processor 200 may not end the processing to end the automatic reverse until the driver performs a brake operation.

[Step S20]

Thereafter, in Step S20, the processor 200 may perform processing to determine whether the ignition has been turned off. In a case where determination is made that the ignition has been turned off, the processor 200 may end the automatic reverse driving control processing. In a case where determination is made that the ignition has not been turned off, the processor 200 may cause the processing to proceed to Step S11.

Figure 4:
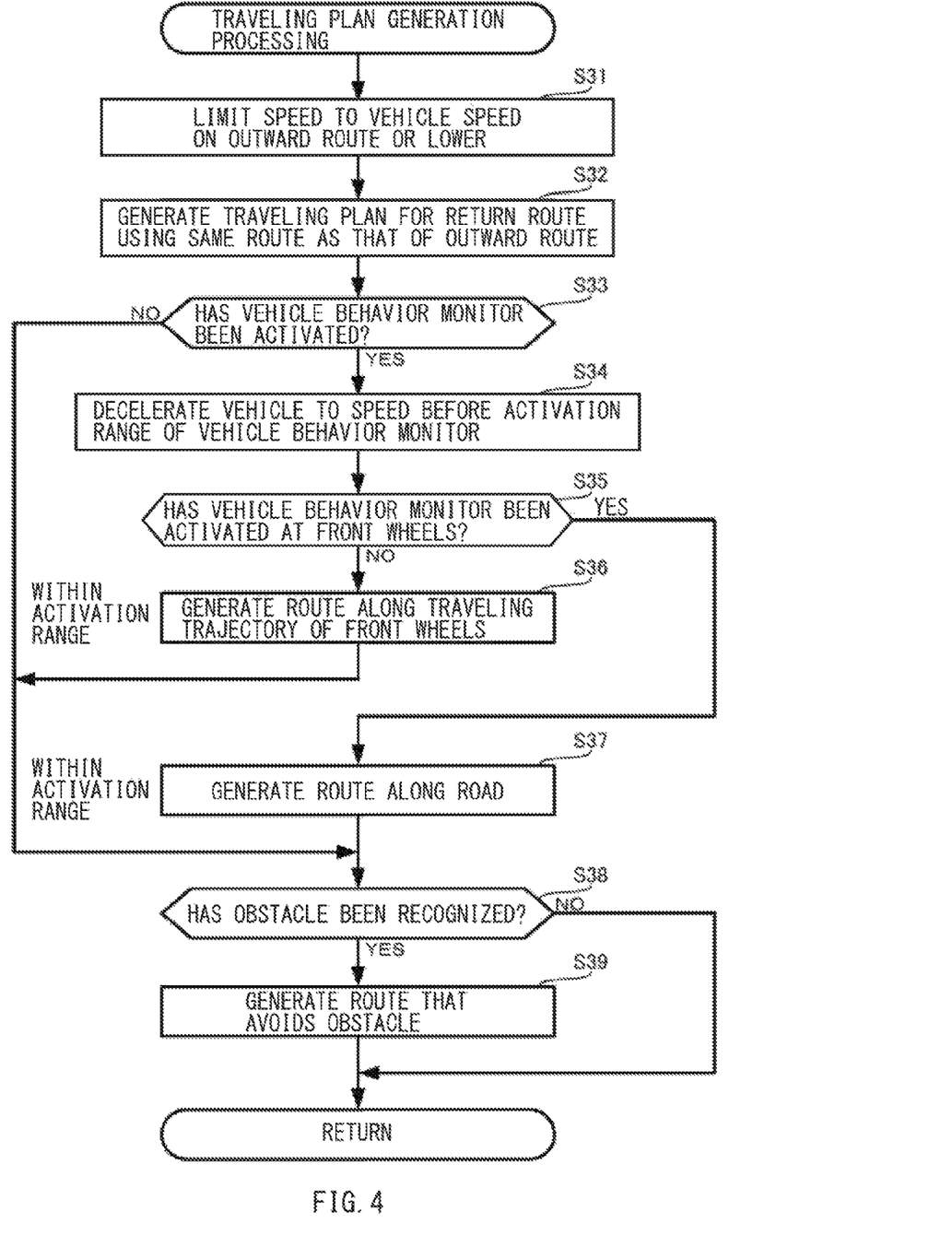
FIG. 4 is a flowchart illustrating traveling plan generation processing in the automatic reverse driving control processing.

Next, description is given, with reference to FIG. 4, of the traveling plan generation processing to be performed by the processor 200. FIG. 4 illustrates a subroutine of Step S15 (traveling plan generation processing) in FIG. 3.

[Step S31]

In the traveling plan generation processing, in Step S31, the processor 200 may first perform processing to limit the vehicle speed of the vehicle 1 on the return route to the vehicle speed on the outward route or lower. In one example, the processor 200 may limit the vehicle speed on the return route to the vehicle speed on the outward route or lower on the basis of information on the vehicle speed on the outward route. For example, the processor 200 may set a vehicle speed slower than that on the outward route at a preset deceleration rate. The deceleration rate is not limited to a constant deceleration rate, but may be, for example, a deceleration rate in response to a road condition. In addition, the processor 200 may set a decrease in the vehicle speed, for example, by decreasing the number of engine revolution. The processor 200 may decrease the vehicle speed by setting a gear ratio on the return route lower than a gear ratio on the outward route.

[Step S32]

Thereafter, in Step S32, the processor 200 may perform processing to generate a traveling plan for the return route using the same route of the outward route. In one example, the processor 200 may set a traveling route for the return route to allow the vehicle 1 to travel oppositely with respect to the traveling trajectory of the outward route. Note that the processor 200 may generate the traveling plan for the return route from a current point to the reverse traveling end point. As described below, the processor 200 may correct the generated traveling plan, for example, for the traveling range where the vehicle behavior monitor 60 has been activated.

[Step S33]

Then, in Step S33, the processor 200 may perform processing to determine whether the vehicle behavior monitor 60 has been activated. In one example, the processor 200 may determine whether there is a traveling range where the vehicle behavior monitor 60 has been activated between the reverse traveling end point and the current point in the traveling on the outward route.

In a case where determination is made that the vehicle behavior monitor 60 has been activated, the processor 200 may cause the processing to proceed to Step S34. In a case where determination is made that the vehicle behavior monitor 60 has not been activated, the processor 200 may cause the processing to proceed to Step S38. Note that, in a case where there are multiple traveling ranges in each of which the vehicle behavior monitor 60 has been activated between the reverse traveling end point and the current point, the processor 200 may perform, for each of the traveling ranges, processing to be performed in a case where the vehicle behavior monitor 60 has been activated.

[Step S34]

In Step S34, the processor 200 may perform processing to decelerate the vehicle 1 to a speed before the activation range of the vehicle behavior monitor 60. In one example, the processor 200 may generate a traveling plan to decelerate the vehicle 1, on the traveling route for the return route, to a speed before reaching the traveling range where the vehicle behavior monitor 60 has been activated on the outward route.

[Step S35]

Then, in Step S35, the processor 200 may perform processing to determine whether the vehicle behavior monitor 60 has been activated at the front wheels. In one example, the processor 200 may determine whether behaviors of the front wheels of the vehicle 1 have been controlled to cause the vehicle 1 to travel stably in the activation range of the vehicle behavior monitor 60.

In a case where determination is made that the vehicle behavior monitor 60 has been activated at the front wheels, the processor 200 may cause the processing to proceed to Step S37. In a case where determination is made that the vehicle behavior monitor 60 has not been activated at the front wheels, the processor 200 may cause the processing to proceed to Step S36.

[Step S36]

In Step S36, the processor 200 may perform processing to generate a route along a traveling trajectory of the front wheels. That is, the processor 200 may judge that rear wheels have skidded on the outward route, and may correct the route for the return route to allow the rear wheels to also follow the same route as the traveling trajectory of the front wheels on the outward route in the traveling plan for the return route.

Then, when the processing is ended to generate the route along the traveling trajectory of the front wheels, the processor 200 may cause the processing to proceed to Step S38.

Figure 5:
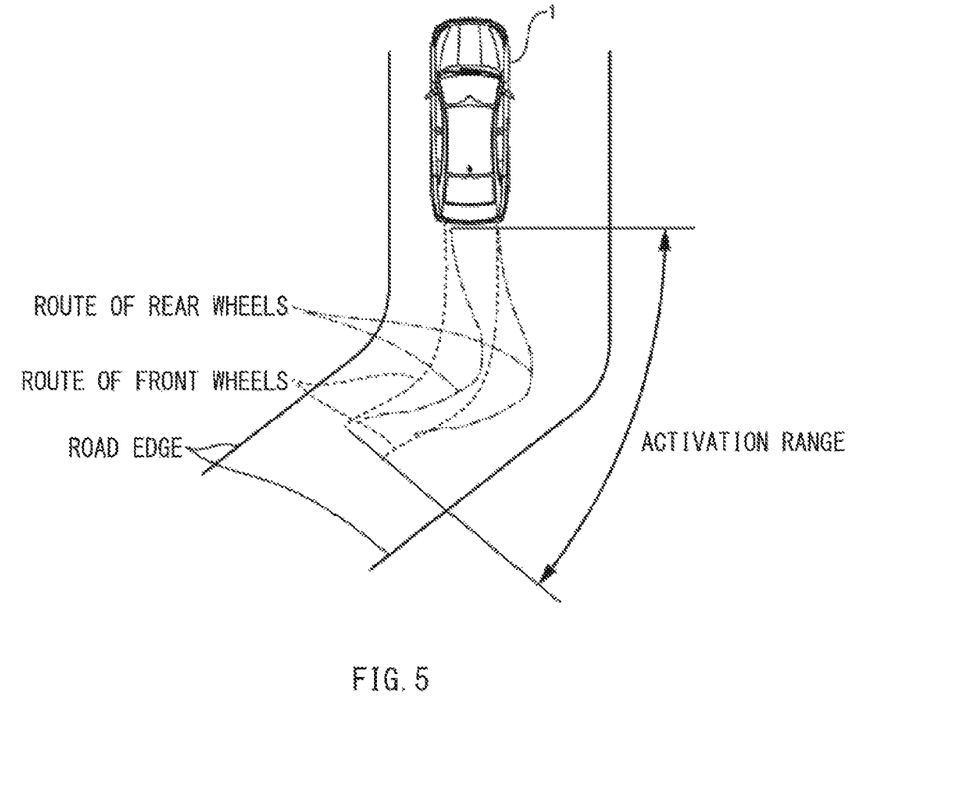
FIG. 5 is a diagram illustrating an example of a traveling trajectory of a vehicle when rear wheels skid on an outward route.

Here, FIG. 5 illustrates an example of the traveling trajectory of the vehicle 1 when the rear wheels skid on the outward route. As illustrated in FIG. 5, the route on which the front wheels of the vehicle 1 have traveled is a typical traveling route along the shape of a road. Meanwhile, a route on which the rear wheels of the vehicle 1 have traveled is shifted greatly to one side of the road. For this reason, when such a route on which the rear wheels have traveled is set as the traveling route for the return route, the vehicle 1 may be forced to drive unstably. Accordingly, the processor 200 may correct the route for the return route to allow the rear wheels to also follow the same route as the traveling trajectory of the front wheels on the outward route in the traveling plan for the return route, thus enabling the vehicle 1 to travel stably.

[Step S37]

In Step S37, the processor 200 may perform processing to generate a route along a road. That is, the processor 200 may judge that the vehicle 1 has skidded, and may correct the route for the return route to allow the vehicle 1 to follow a route along the shape of the road in the traveling plan for the return route. For example, the processor 200 may correct the route for the return route to allow the center of the vehicle 1 to travel in reverse along the center of the road.

When having ended the processing to generate the route along the road, the processor 200 may cause the processing to proceed to Step S38.

Figure 6:
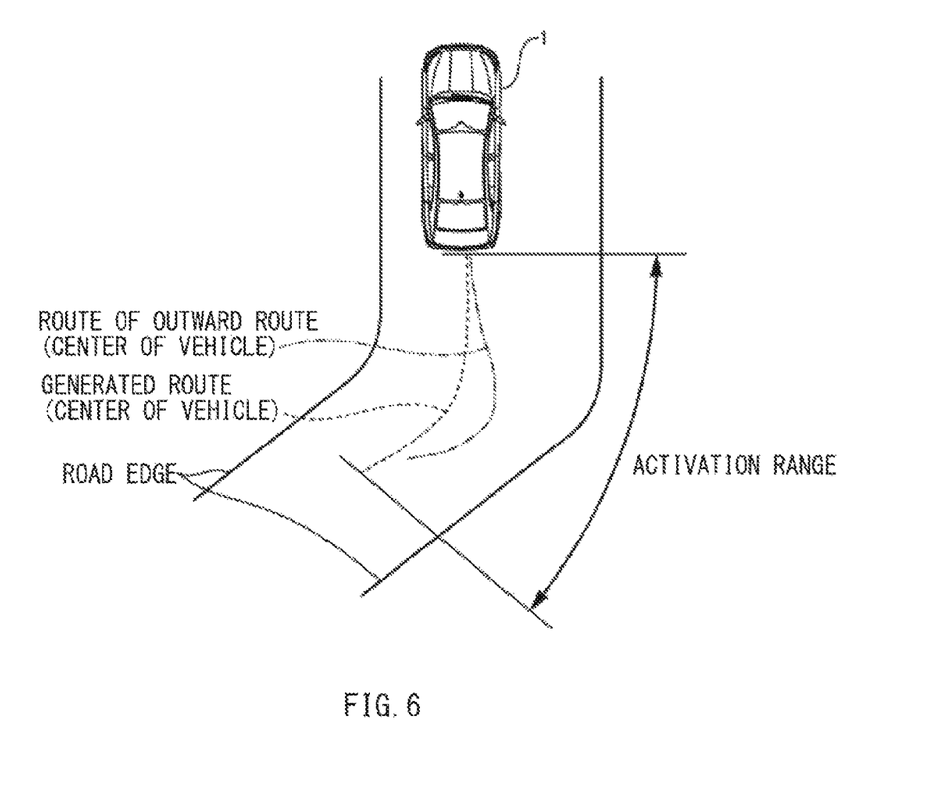
FIG. 6 is a diagram illustrating an example of a traveling trajectory of a vehicle when the vehicle skids on an outward route.

Here, FIG. 6 illustrates an example of a traveling trajectory of the vehicle 1 when the vehicle 1 have skidded on the outward route. As illustrated in FIG. 6, the route on which the center of the vehicle 1 has traveled on the outward route is greatly different from the shape of the road, and is shifted greatly to one side of the road. For this reason, when such a route traveled on the outward route is set as the traveling route for the return route, the vehicle 1 may be forced to travel unstably. Accordingly, the processor 200 may correct the route for the return route to allow the center of the vehicle 1 to follow a route along the shape of the road, thus enabling the vehicle 1 to travel stably.

[Step S38]

In Step S38, the processor 200 may perform processing to determine whether an obstacle has been recognized in the route. In a case where determination is made that an obstacle has been recognized in the route, the processor 200 may cause the processing to proceed to Step S39. In a case where determination is made that an obstacle has not been recognized in the route, the processor 200 may end the traveling plan generation processing.

[Step S39]

In Step S39, the processor 200 may perform processing to generate a route that avoids the obstacle. For example, in a case where the vehicle behavior monitor 60 is activated, the processor 200 may generate a route different from the outward route as the route for the return route. However, in a case where there is an obstacle in the route, even the same route as the outward route can be generated as the route for the return route.

Then, when having ended the processing to generate the route that avoids the obstacle, the processor 200 may end the traveling plan generation processing.

As described above, in the automatic reverse driving controller according to an example embodiment of the disclosure, when an instruction to switch to the automatic reverse traveling is inputted by the automatic reverse traveling instruction input unit 140, the processor 200 may correct the traveling trajectory of the outward route on the basis of the road surface condition to determine the traveling route for the return route, and may control the reverse traveling of the vehicle to control the reverse traveling to a reverse traveling end point P. For this reason, it is possible for the automatic reverse driving controller according to an example embodiment of the disclosure to cope with a change in the road surface condition or improvement in unstable traveling during forward traveling, to allow the vehicle to easily return even when being unable to travel forward, and to allow a driver of the vehicle to travel, for example, on a bad road at ease.

In addition, in the automatic reverse driving controller according to an example embodiment of the disclosure, in a case where there is a traveling range where the vehicle behavior monitor 60 has been activated between the reverse traveling end point P and a current point Q, the processor 200 may decelerate the vehicle to a speed before reaching the traveling range where the vehicle behavior monitor 60 has been activated in determining the traveling route for the return route. This makes it possible to stably perform the automatic reverse traveling, for example, even in a slippery road surface condition.

Further, in the automatic reverse driving controller according to an example embodiment of the disclosure, in a case where the vehicle behavior monitor 60 is activated at the rear wheels, the processor 200 may set the traveling trajectory of the front wheels on the outward route as the traveling route for the return route. This makes it possible to set a route traveled normally without slipping as the traveling route for the return route, thus making it possible to perform stable automatic reverse traveling.

Furthermore, in the automatic reverse driving controller according to an example embodiment of the disclosure, in a case where the vehicle behavior monitor 60 is activated at the front wheels, the processor 200 may set a traveling route along a curvature of the road as the traveling route for the return route on the basis of road data in the traveling trajectory of the outward route. This makes it possible to set a suitable route along the shape of the road as the traveling route for the return route, thus making it possible to perform stable automatic reverse traveling.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

As used herein, the term "collision" may be used interchangeably with the term "contact".

The ECU 100 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 100 illustrated in FIG. 2.

The invention claimed is:

1. An automatic reverse driving controller comprising:
a control unit configured to control driving and steering of a vehicle and control traveling of the vehicle, wherein the control unit comprises:
- a traveling information input unit configured to input information related to a traveling trajectory of the vehicle and a road surface condition;
- a traveling information storage unit configured to store the inputted information related to the traveling trajectory of the vehicle and the road surface condition;
- an automatic reverse traveling instruction input unit configured to receive an input of a switching instruction to switch from traveling performed by a driving operation of a driver who drives the vehicle to automatic reverse traveling performed by the control unit;
- a processing unit configured to, in response to the input of the switching instruction, correct a traveling trajectory of an outward route on a basis of the road surface condition to determine a traveling route for a return route, and control reverse traveling of the vehicle; and
- a vehicle behavior monitoring information input unit configured to monitor a vehicle operation of the driver and a movement of the vehicle, and receive from a vehicle behavior monitor an input of a traveling range where a vehicle behavior of the vehicle is stabilized, the vehicle behavior monitor being configured to stabilize the vehicle behavior of the vehicle in response to a traveling state of the vehicle,
- wherein in a case where the traveling range is inputted where the vehicle behavior is stabilized, the processing unit is configured to cause the traveling information storage unit to store the traveling range, and decelerate the vehicle before reaching the traveling range in determining the traveling route for the return route.

2. The automatic reverse driving controller according to claim 1, wherein
the processing unit is further configured such that in a case where the vehicle operation and the movement of the vehicle are inconsistent with each other at a rear wheel of the vehicle in the traveling range, the processing unit sets the traveling trajectory of the outward route at a front wheel of the vehicle as the traveling route for the return route.

3. The automatic reverse driving controller according to claim 1, wherein
the traveling information storage unit is further configured to store data on a road on which the vehicle travels, and
the processing unit is further configured such that in a case where the vehicle operation and the movement of the vehicle are inconsistent with each other at a front wheel of the vehicle in the traveling range, the processing unit sets, as the traveling route for the return route, a traveling route along a curvature of the road on a basis of the data on the road in the traveling trajectory of the outward route.

4. The automatic reverse driving controller according to claim 2, wherein
the traveling information storage unit is configured to store data on a road on which the vehicle travels, and
the processing unit is configured such that in a case where the vehicle operation and the movement of the vehicle are inconsistent with each other at the front wheel of the vehicle in the traveling range, the processing unit sets, as the traveling route for the return route, a traveling route along a curvature of the road on a basis of the data on the road in the traveling trajectory of the outward route.

5. An automatic reverse driving controller comprising:
circuitry configured to:
- control driving and steering of a vehicle and control traveling of the vehicle;
- input information related to a traveling trajectory of the vehicle and a road surface condition;
- store the inputted information related to the traveling trajectory of the vehicle and the road surface condition;
- receive an input of a switching instruction to switch from traveling performed by a driving operation of a driver who drives the vehicle to automatic reverse traveling performed by the circuitry;
- correct, in response to the input of the switching instruction, a traveling trajectory of an outward route on a basis of the road surface condition to determine a traveling route for a return route, and control reverse traveling of the vehicle; and
- monitor a vehicle operation of the driver and a movement of the vehicle, and receive from a vehicle behavior monitor an input of a traveling range where a vehicle behavior of the vehicle is stabilized, the vehicle behavior monitor being configured to stabilize the vehicle behavior of the vehicle in response to a traveling state of the vehicle,
- wherein in a case where the traveling range is inputted where the vehicle behavior is stabilized, the circuitry is configured to cause the traveling range to be stored, and decelerate the vehicle before reaching the traveling range in determining the traveling route for the return route.

6. The automatic reverse driving controller according to claim 5, wherein
the circuitry is further configured such that in a case where the vehicle operation and the movement of the vehicle are inconsistent with each other at a rear wheel of the vehicle in the traveling range, the circuitry sets the traveling trajectory of the outward route at a front wheel of the vehicle as the traveling route for the return route.

7. The automatic reverse driving controller according to claim 5, wherein
the circuitry is further configured:
- store data on a road on which the vehicle travels; and
- in a case where the vehicle operation and the movement of the vehicle are inconsistent with each other at a front wheel of the vehicle in the traveling range, set, as the traveling route for the return route, a traveling route along a curvature of the road on a basis of the data on the road in the traveling trajectory of the outward route.

8. The automatic reverse driving controller according to claim 6, wherein
the circuitry is further configured:
- store data on a road on which the vehicle travels; and
- in a case where the vehicle operation and the movement of the vehicle are inconsistent with each other at the front wheel of the vehicle in the traveling range, set, as the traveling route for the return route, a traveling route along a curvature of the road on a basis of the data on the road in the traveling trajectory of the outward route.

* * * * *